United States Patent
Nakano et al.

(10) Patent No.: US 10,472,475 B2
(45) Date of Patent: Nov. 12, 2019

(54) METHOD OF PRODUCING GLASS-FIBER-REINFORCED THERMOPLASTIC RESIN MOLDED OBJECT AND GLASS-FIBER-REINFORCED THERMOPLASTIC RESIN MOLDED OBJECT OBTAINED BY THE METHOD

(71) Applicant: Sumitomo Riko Company Limited, Komaki-shi, Aichi (JP)

(72) Inventors: Masayoshi Nakano, Komaki (JP); Junichiro Suzuki, Komaki (JP); Kanako Munenobu, Komaki (JP); Kei Okumura, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 40 days.

(21) Appl. No.: 15/857,786

(22) Filed: Dec. 29, 2017

(65) Prior Publication Data
US 2018/0282496 A1  Oct. 4, 2018

(30) Foreign Application Priority Data
Mar. 31, 2017 (JP) ................................ 2017-070332

(51) Int. Cl.
| | | |
|---|---|---|
| C08K 3/40 | (2006.01) | |
| C08L 77/06 | (2006.01) | |
| C08L 77/02 | (2006.01) | |
| C08J 5/08 | (2006.01) | |
| C08J 5/04 | (2006.01) | |
| C08G 69/46 | (2006.01) | |
| C08L 75/04 | (2006.01) | |

(52) U.S. Cl.
CPC ............ *C08J 5/043* (2013.01); *C08G 69/46* (2013.01); *C08K 3/40* (2013.01); *C08L 77/02* (2013.01); *C08L 77/06* (2013.01); *C08J 2300/22* (2013.01); *C08K 2201/005* (2013.01); *C08L 75/04* (2013.01)

(58) Field of Classification Search
None
See application file for complete search history.

(56) References Cited

U.S. PATENT DOCUMENTS

| | | | |
|---|---|---|---|
| 4,238,266 A | 12/1980 | Steinberg et al. | |
| 5,750,616 A | 5/1998 | Shimpuku et al. | |
| 6,096,818 A | 8/2000 | Nakaura et al. | |
| 8,969,465 B2 * | 3/2015 | Park .................. | C08K 7/14 |
| | | | 524/494 |
| 2002/0099124 A1 | 7/2002 | Patel | |
| 2004/0023012 A1 | 2/2004 | Kia et al. | |
| 2007/0122615 A1 | 5/2007 | Mutsuda et al. | |
| 2009/0131208 A1 | 5/2009 | Hawryluck et al. | |
| 2011/0124789 A1 | 5/2011 | Choi et al. | |
| 2015/0259511 A1 | 9/2015 | Nakano et al. | |
| 2017/0095953 A1 | 4/2017 | Munenobu et al. | |

FOREIGN PATENT DOCUMENTS

| | | |
|---|---|---|
| AU | 2002301429 A1 | 3/2003 |
| DE | 2213305 A1 | 9/1972 |
| GB | 1392175 A | 4/1975 |
| JP | 8-269228 A | 10/1996 |
| JP | 2001-179738 A | 7/2001 |
| JP | 2002-53711 A | 2/2002 |
| JP | 2003-285323 A | 10/2003 |
| JP | 2005-297338 A | 10/2005 |
| JP | 2010-189637 A | 9/2010 |
| JP | 2010-538104 A | 12/2010 |
| JP | 2012-25844 A | 2/2012 |
| JP | 2015-67685 A | 4/2015 |
| WO | 2001/59009 A1 | 8/2001 |

\* cited by examiner

*Primary Examiner* — Tae H Yoon
(74) *Attorney, Agent, or Firm* — Westerman, Hattori, Daniels & Adrian

(57) ABSTRACT

Provided are a method of producing a glass-fiber-reinforced thermoplastic resin molded object by which a special glass-fiber-reinforced thermoplastic resin molded object excellent in mechanical strength and aesthetic appearance can be easily produced, and a glass-fiber-reinforced thermoplastic resin molded object obtained by the method. Glass fiber chopped strands subjected to a surface treatment with at least one of a urethane-based sizing agent and an acrylic urethane-based sizing agent, the glass fiber chopped strands each having a fiber length of from 1.2 mm to 1.8 mm, and a thermoplastic resin are each directly loaded into an injection molding machine, and are subjected to injection molding to produce the following special glass-fiber-reinforced thermoplastic resin molded object. The resin molded object shows a specific fiber length distribution and shows a specific tensile strength, and unopened glass fibers are absent on the surface of the resin molded object.

4 Claims, No Drawings

METHOD OF PRODUCING GLASS-FIBER-REINFORCED THERMOPLASTIC RESIN MOLDED OBJECT AND GLASS-FIBER-REINFORCED THERMOPLASTIC RESIN MOLDED OBJECT OBTAINED BY THE METHOD

CROSS-REFERENCE TO RELATED APPLICATION

This application claims priority to Japanese Application No. 2017-070332, filed Mar. 31, 2017. The disclosure of this application is incorporated herein by reference in its entirety for all purposes.

TECHNICAL FIELD

The present disclosure relates to a method of producing a glass-fiber-reinforced thermoplastic resin molded object improved in mechanical strength and the like by dispersing glass fibers, and to a glass-fiber-reinforced thermoplastic resin molded object obtained by the method.

BACKGROUND ART

A part to be used in an engine room of an automobile is required to have properties such as mechanical strength under high-temperature and high-humidity conditions, water resistance, heat resistance, and calcium chloride resistance (because calcium chloride is used for a snow-melting agent). As such part, a part made of a metal has heretofore generally been used. In recent years, however, in response to a need for reducing weight, investigations have been made on automobile parts each using a fiber-reinforced resin (FRP) as an alternative to metal. Of those, a glass-fiber-reinforced thermoplastic resin obtained by dispersing glass fibers in a thermoplastic resin has been expected to be applied to such applications as described above because the resin is excellent in versatility, processability, moldability, and the like, and is excellent in terms of cost. A molded object formed of the glass-fiber-reinforced thermoplastic resin is typically produced by melt-kneading the thermoplastic resin and the glass fibers to provide a pellet, remelting the pellet, and subjecting the resultant to injection molding or the like (see, for example, JP-A-2012-25844, JP-A-2003-285323, and JP-A-2010-189637).

RELATED ART DOCUMENT

Patent Documents

PTL 1: JP-A-2012-25844
PTL 2: JP-A-2003-285323
PTL 3: JP-A-2010-189637
PTL 4: JP-A-2015-67685

SUMMARY OF INVENTION

However, when a target glass-fiber-reinforced thermoplastic resin molded object is produced after its thermoplastic resin and glass fibers have been melt-kneaded and pelletized once as described above, at the time of the production of the pellet, the glass fibers receive a shear stress in a melt-kneading machine to break, and hence the glass fibers are reduced in size (their fiber lengths become 0.5 mm or less). Further, the glass fibers receive a shear stress at the time of injection molding to be further reduced in size. Accordingly, the glass fibers in the glass-fiber-reinforced thermoplastic resin molded object thus obtained involve a problem in that the glass fibers are reduced in size to so large an extent that their improving effect on the strength of the molded object is small.

In view of the foregoing, an investigation has been made on the use of a long fiber-reinforced resin pellet (pellet containing glass fibers produced by a drawing method, the fibers having long fiber lengths). However, when the long fiber-reinforced resin pellet is used as described above, moldability is adversely affected. Further, a residual stress increases owing to the long fibers. Moreover, a resin having a low molecular weight needs to be used for improving the permeability of a resin into the glass fibers. Accordingly, a problem in that a glass-fiber-reinforced thermoplastic resin molded object obtained from the pellet cannot obtain a sufficient mechanical strength occurs. In addition, as described in each of JP-A-2003-285323 and JP-A-2010-189637 listed above, a method involving molding a mixture of the long fiber-reinforced resin pellet and a short fiber-reinforced resin pellet has been proposed. When the method involving molding the mixture of the pellets as described above is applied, the moldability is improved. However, a fiber length distribution is polarized, and hence the problem of the residual stress has not been solved yet.

In addition, a molded object formed of such conventional glass-fiber-reinforced thermoplastic resin as described above involves a problem in that when the resin is molded into a thin-walled shape, its mechanical strength particularly in a high-temperature atmosphere or at the time of its water absorption reduces. The resin has heretofore been molded into a thick-walled shape to solve such problem. However, when the resin is molded into a thick-walled shape, a problem in that a weight-reduction effect is small newly occurs. To solve those problems, the applicant has already proposed a technology involving setting the fiber length distribution of glass fibers in the molded object to a distribution within a specific range different from those of JP-A-2012-25844, JP-A-2003-285323, and JP-A-2010-189637 as disclosed in JP-A-2015-67685 listed above to achieve an expected object.

The fiber length distribution of glass fibers described in JP-A-2015-67685 is hard to achieve by a conventional method involving pelletizing a mixture of glass fibers and a thermoplastic resin once, and performing injection molding or the like through the use of the resultant pellet as a material to provide a glass-fiber-reinforced thermoplastic resin molded object like JP-A-2012-25844, JP-A-2003-285323, and JP-A-2010-189637. Accordingly, in JP-A-2015-67685, a production method involving directly loading each of a thermoplastic resin and the glass fibers into an injection molding machine, and performing their injection molding to provide a target glass-fiber-reinforced thermoplastic resin molded object is applied. In the production method, a kneading step needed for pelletization is omitted, and hence reductions in fiber lengths of the glass fibers can be prevented.

However, particularly when a versatile injection molding machine is used in an approach involving directly loading the respective materials into an injection molding machine like JP-A-2015-67685, unopened glass fibers may occur in the molded object, and hence may adversely affect the mechanical strength and appearance of the molded object. In the case where the target glass-fiber-reinforced thermoplastic resin molded object is produced after the thermoplastic resin and the glass fibers have been melt-kneaded and pelletized once like a conventional case, at the time of the pelletization, the resin and the glass fibers can be sufficiently mixed with a biaxial extruder because of its high shear and heat quantity. Accordingly, even when glass fiber chopped strands subjected to a surface treatment with a sizing agent are used as the glass fibers serving as the materials, the occurrence of the unopened glass fibers (glass fibers that are not mixed with the resin) in the glass-fiber-reinforced thermoplastic resin molded object to be obtained can be easily suppressed. However, the versatile injection molding machine has a low shearing ability and an insufficient heat quantity, and hence when only mixing with the injection molding machine is performed like JP-A-2015-67685, it is difficult to sufficiently disperse the glass fibers in the resin until the unopened glass fibers are absent.

The use of a special injection molding machine that can apply a high shear is a particularly effective approach to solving such problem as described above. Accordingly, it is recommended that such injection molding machine be used even in the method of producing a glass-fiber-reinforced thermoplastic resin molded object disclosed in JP-A-2015-67685. However, such injection molding machine is expensive, and a problem in that a manufacturer that has already owned a versatile injection molding machine is required to further make a facility investment occurs. In order to reduce the amount of the unopened glass fibers, an investigation has been made on an approach involving reducing the melt viscosity of the resin at high temperature to improve its impregnability. In general, however, when the viscosity of the resin is reduced, a shear force for opening the glass fibers also reduces, and hence it is difficult to sufficiently solve such problem as described above through the approach.

The present disclosure has been made in view of such circumstances, and an object of the present disclosure is to provide a method of producing a glass-fiber-reinforced thermoplastic resin molded object by which a special glass-fiber-reinforced thermoplastic resin molded object excellent in mechanical strength and aesthetic appearance can be easily produced, and a glass-fiber-reinforced thermoplastic resin molded object obtained by the method.

In order to achieve the above-mentioned object, according to a first aspect of the present disclosure, there is provided a method of producing a glass-fiber-reinforced thermoplastic resin molded object, including directly loading a thermoplastic resin and glass fiber chopped strands subjected to a surface treatment with at least one of a urethane-based sizing agent and an acrylic urethane-based sizing agent, the glass fiber chopped strands each having a fiber length of from 1.2 mm to 1.8 mm into an injection molding machine, followed by injection molding thereof to provide a glass-fiber-reinforced thermoplastic resin molded object described in the following (X):

(X) a glass-fiber-reinforced thermoplastic resin molded object having dispersed therein fibrous fillers including glass fibers, in which the glass fibers in the glass-fiber-reinforced thermoplastic resin molded object have a fiber length described in the following (A) to (D), and are dispersed at ratios with respect to a total number of the fibrous fillers described in the following (A) to (D), and, in the glass-fiber-reinforced thermoplastic resin molded object, a property described in the following (β) is satisfied together with a physical property described in the following (α):
(A) 0.05 mm or more and less than 0.3 mm: from 30% to 60%;
(B) 0.3 mm or more and less than 0.6 mm: from 30% to 60%;
(C) 0.6 mm or more and less than 1.2 mm: from 3% to 20%;
(D) 1.2 mm or more: 0% or more and less than 1%;
(α) an ISO multipurpose dumbbell of the glass-fiber-reinforced thermoplastic resin molded object has a tensile strength (MPa) under an atmosphere at 25° C. of more than a value Y (MPa) represented by the following equation (1):

$$Y=-0.05X^2+6X+70 \qquad (1)$$

where X represents a content (wt. %) of all the glass fibers in the glass-fiber-reinforced thermoplastic resin molded object; and
(β) unopened glass fibers are absent on a surface of the glass-fiber-reinforced thermoplastic resin molded object.

According to a second aspect of the present disclosure, there is provided a glass-fiber-reinforced thermoplastic resin molded object, including a thermoplastic resin molded object having dispersed therein fibrous fillers including glass fibers subjected to a surface treatment with at least one of a urethane-based sizing agent and an acrylic urethane-based sizing agent, the glass fibers have a fiber length described in the following (A) to (D), and are dispersed at ratios with respect to a total number of the fibrous fillers described in the following (A) to (D), and a property described in the following (β) is satisfied together with a physical property described in the following (α):
(A) 0.05 mm or more and less than 0.3 mm: from 30% to 60%;
(B) 0.3 mm or more and less than 0.6 mm: from 30% to 60%;
(C) 0.6 mm or more and less than 1.2 mm: from 3% to 20%;
(D) 1.2 mm or more: 0% or more and less than 1%;
(α) an ISO multipurpose dumbbell of the glass-fiber-reinforced thermoplastic resin molded object has a tensile strength (MPa) under an atmosphere at 25° C. of more than a value Y (MPa) represented by the following equation (1):

$$Y=-0.05X^2+6X+70 \qquad (1)$$

where X represents a content (wt. %) of all the glass fibers in the glass-fiber-reinforced thermoplastic resin molded object; and
(β) unopened glass fibers are absent on a surface of the glass-fiber-reinforced thermoplastic resin molded object.

The inventors have made extensive investigations to solve the problems. As a result, the inventors have found that when glass fiber chopped strands subjected to a surface treatment with at least one of a urethane-based sizing agent and an acrylic urethane-based sizing agent, the glass fiber chopped strands each having a fiber length of from 1.2 mm to 1.8 mm, are used as glass fibers serving as materials, and the glass fiber chopped strands and a thermoplastic resin are each directly loaded into an injection molding machine to be subjected to injection molding, even in the case where a versatile injection molding machine is used, the openability and dispersibility of the glass fiber chopped strands subjected to the surface treatment with the sizing agent can be sufficiently improved, and the occurrence of unopened glass fibers in a glass-fiber-reinforced thermoplastic resin molded object can be effectively suppressed, and hence a target glass-fiber-reinforced thermoplastic resin molded object showing a specific glass fiber length distribution and the like can be easily produced.

The glass-fiber-reinforced thermoplastic resin molded object thus obtained is a special glass-fiber-reinforced thermoplastic resin molded object excellent in strength and aesthetic appearance because the molded object has a specific glass fiber length distribution and the like, and unopened glass fibers do not occur in the molded object. Accordingly, the molded object can achieve both improvements in mechanical strength and appearance.

As described above, the method of producing a glass-fiber-reinforced thermoplastic resin molded object of the present disclosure includes producing a target glass-fiber-reinforced thermoplastic resin molded object showing a specific glass fiber length distribution by directly loading each of: glass fiber chopped strands subjected to a surface treatment with at least one of a urethane-based sizing agent and an acrylic urethane-based sizing agent, the glass fiber chopped strands each having a fiber length of from 1.2 mm to 1.8 mm; and a thermoplastic resin into an injection molding machine, followed by injection molding thereof. The production method is advantageous in terms of facility cost and the like because of the following reason: even in the case where a versatile injection molding machine is used, the openability and dispersibility of the glass fiber chopped strands can be sufficiently improved, and hence even when a special injection molding machine that can apply a high shear is not used, the target glass-fiber-reinforced thermoplastic resin molded object showing a specific glass fiber length distribution can be easily produced.

In particular, when glass fiber chopped strands subjected to a surface treatment with the acrylic urethane-based sizing agent are used as the above-mentioned glass fiber chopped strands each having a fiber length of from 1.2 mm to 1.8 mm, the handleability of the glass fiber chopped strands can be further improved, and hence the target glass-fiber-reinforced thermoplastic resin molded object showing a specific glass fiber length distribution can be more easily produced.

In addition, when a polyamide-based resin is used as the thermoplastic resin, the target glass-fiber-reinforced thermoplastic resin molded object showing a specific glass fiber length distribution can be more easily produced from the viewpoints of its melt viscosity and the like.

In addition, the glass-fiber-reinforced thermoplastic resin molded object is produced as described above and has a specific glass fiber length distribution and the like, and hence can achieve both improvements in mechanical strength and appearance. In addition, the molded object can exhibit excellent performance in applications where a mechanical strength is required like bearing parts for automobiles, such as an engine mount, a bush, and a torque rod. In addition to the foregoing, the glass-fiber-reinforced thermoplastic resin molded object can also exhibit excellent performance in applications where aesthetic appearance is required, such as an engine cover, a brake pedal wheel, and a wheel cover, because unopened glass fibers are absent on the surface of the molded object.

In particular, when the glass fibers are glass fibers subjected to a surface treatment with the acrylic urethane-based sizing agent, the strength of the glass-fiber-reinforced thermoplastic resin molded object under actual use conditions becomes more excellent.

In addition, when the thermoplastic resin is a polyamide-based resin, the glass-fiber-reinforced thermoplastic resin molded object becomes more excellent in, for example, strength and elasticity in a high-temperature atmosphere.

DESCRIPTION OF EMBODIMENTS

Now, embodiments of the present disclosure are described in detail.

As described in the foregoing, a method of producing a glass-fiber-reinforced thermoplastic resin molded object (hereinafter sometimes simply abbreviated as "molded object") of the present disclosure is performed by a step of directly loading each of: glass fiber chopped strands subjected to a surface treatment with at least one of a urethane-based sizing agent and an acrylic urethane-based sizing agent, the glass fiber chopped strands each having a fiber length of from 1.2 mm to 1.8 mm; and a thermoplastic resin into an injection molding machine, followed by their injection molding to provide a glass-fiber-reinforced thermoplastic resin molded object described in the following (X):

(X) a glass-fiber-reinforced thermoplastic resin molded object having dispersed therein fibrous fillers, in which glass fibers subjected to the surface treatment with at least one of the urethane-based sizing agent and the acrylic urethane-based sizing agent, the glass fibers each having a fiber length described in any one of the following (A) to (D), are dispersed at ratios described in the following (A) to (D) with respect to a total number of the fibrous fillers, and a property described in the following (β) is satisfied together with a physical property described in the following (α):

(A) 0.05 mm or more and less than 0.3 mm: from 30% to 60%;
(B) 0.3 mm or more and less than 0.6 mm: from 30% to 60%;
(C) 0.6 mm or more and less than 1.2 mm: from 3% to 20%;
(D) 1.2 mm or more: 0% or more and less than 1%;
(α) an ISO multipurpose dumbbell of the glass-fiber-reinforced thermoplastic resin molded object has a tensile strength (MPa) under an atmosphere at 25° C. of more than a value Y (MPa) represented by the following equation (1):

$$Y = -0.05X^2 + 6X + 70 \quad (1)$$

where X represents a content (wt. %) of all the glass fibers in the glass-fiber-reinforced thermoplastic resin molded object; and (β) unopened glass fibers are absent on a surface of the glass-fiber-reinforced thermoplastic resin molded object.

That is, the target glass-fiber-reinforced thermoplastic resin molded object can be obtained by directly loading a required amount of each of: the glass fiber chopped strands subjected to a specific surface treatment, the glass fiber chopped strands each having a specific length; and the thermoplastic resin into the injection molding machine, followed by their injection molding. Such specific glass fiber length distribution and the like as in the present disclosure are extremely hard to obtain by a conventional method involving pelletizing a mixture of the glass fibers and the thermoplastic resin once, and performing injection molding or the like through the use of the resultant pellet as a material to provide the glass-fiber-reinforced thermoplastic resin molded object. In other words, in the glass-fiber-reinforced thermoplastic resin molded object, a kneading step can be omitted by such direct molding as described above, and hence reductions in fiber lengths of the glass fibers are prevented, and such specific fiber length distribution as described in the (A) to (D), and the physical property and the property described in the (α) and (β) can be easily obtained. Further, the number of times of the thermal hysteresis of the production method is smaller than that of the conventional pellet production method by one. Accordingly, a reduction in molecular weight at the time of the molding is small, and hence the former production method can contribute to an improvement in strength of the resin molded object to be obtained.

One feature of the method of producing a glass-fiber-reinforced thermoplastic resin molded object of the present disclosure lies in that a versatile injection molding machine may be used as the injection molding machine instead of a special injection molding machine that can apply a high shear. However, it is not meant that such special injection molding machine as described above cannot be used in the production method of the present disclosure. That is, when one has already owned such special injection molding machine as described above, the special injection molding machine may be applied to the production method of the present disclosure.

As described in the foregoing, glass fiber chopped strands each having a fiber length of from 1.2 mm to 1.8 mm are used as the glass fiber chopped strands to be used in the method of producing a glass-fiber-reinforced thermoplastic resin molded object of the present disclosure. That is, this is because when glass fiber chopped strands each having a fiber length of less than 1.2 mm are used in the production method, the following problems occur: remaining fiber lengths in the molded object become shorter, and hence the tensile strength of the molded object reduces, and the glass fiber chopped strands adhere to the hopper of the injection molding machine owing to an influence of static electricity to deteriorate their handleability. It is also because when, in contrast, glass fiber chopped strands each having a fiber length of more than 1.8 mm are used, the following problem occurs: unopened glass fibers are liable to occur owing to the occurrence of a cotton-like product by the entanglement of the glass fibers or to a reduction in ratio of end portions serving as the starting points of the opening of the glass fibers.

Glass fiber chopped strands subjected to a surface treatment with at least one of the urethane-based sizing agent and the acrylic urethane-based sizing agent are used as the glass fiber chopped strands to be used in the method of producing a glass-fiber-reinforced thermoplastic resin molded object of the present disclosure because the glass fiber chopped strands are highly compatible with the thermoplastic resin, such as a polyamide resin, are easy to open, and are easy to disperse. In addition, the glass fiber chopped strands can be obtained by cutting a strand, which is obtained by bundling several hundreds to several thousands of elongated glass filaments subjected to a surface treatment with at least one of the urethane-based sizing agent and the acrylic urethane-based sizing agent, into a length of from 1.2 mm to 1.8 mm. In addition, glass fiber chopped strands subjected to a surface treatment with the acrylic urethane-based sizing agent are preferably used as the above-mentioned glass fiber chopped strands each having a fiber length of from 1.2 mm to 1.8 mm because the glass fiber chopped strands have higher handleability, and are easy to open and easy to disperse, and hence the target glass-fiber-reinforced thermoplastic resin molded object showing a specific glass fiber length distribution can be more easily produced.

The urethane-based sizing agent is, for example, a sizing agent synthesized from an isocyanate, such as m-xylylene diisocyanate (XDI), 4,4'-methylenebis(cyclohexyl isocyanate) (HMDI), or isophorone diisocyanate (IPDI), and a polyester-based or polyether-based diol. In addition, the acrylic urethane-based sizing agent is, for example, a sizing agent obtained by adding a copolymer of an unsaturated carboxylic acid, such as acrylic acid or maleic acid, and a monomer, such as ethylene or styrene, or a polymer of an ester, such as an acrylate or a methacrylate, to the urethane-based sizing agent. Those urethane-based sizing agents may be used alone or in combination thereof.

The glass filaments are obtained by melt-spinning glasses, such as an electrical glass (E glass), a chemical glass (C glass), an alkali glass (A glass), a high strength glass (S glass), and an alkali-resistant glass. The fiber diameter of each of the glass filaments is preferably from 3 µm to 25 µm, more preferably from 8 µm to 20 µm.

Meanwhile, examples of the thermoplastic resin to be used in the method of producing a glass-fiber-reinforced thermoplastic resin molded object of the present disclosure include a polyamide resin, a polyethylene resin, a polypropylene resin, a polystyrene resin, a polycarbonate resin, an acrylonitrile-butadiene-styrene copolymer resin, a polyethylene terephthalate resin, a polybutylene terephthalate resin, a polyacetal resin, a modified polyphenylene ether resin, and a polyphenylene sulfide resin. Those thermoplastic resins may be used alone or in combination thereof.

For example, polyamide 6, polyamide 46, polyamide 66, polyamide 610, polyamide 612, polyamide 11, polyamide 12, polyamide 92, polyamide 99, polyamide 912, polyamide 1010, polyamide 6I, polyamide 6T, polyamide 9T, polyamide 10T, polyamide 11T, polyamide MXD6, polyamide 6T/6I, polyamide 6/6I, polyamide 66/6T, and polyamide 66/6I, and a polyamide copolymer containing at least two kinds of polyamide components for forming those polyamides, the components having different structures, are each used as the polyamide resin.

In addition, a polyamide-based resin is preferably used as the thermoplastic resin to be used in the method of producing a glass-fiber-reinforced thermoplastic resin molded object of the present disclosure in terms of, for example, a melt viscosity. Specifically, in the front portion of the cylinder of the injection molding machine (at the initial stage of melting), the resin has so high a viscosity as to easily mix with the fillers, and in the rear portion of the cylinder where a high shear is applied, the resin abruptly causes a reduction in viscosity to easily permeate the fillers. Thus, the resin provides an advantage in that the target glass-fiber-reinforced thermoplastic resin molded object showing a specific glass fiber length distribution can be more easily produced. In the present disclosure, the polyamide-based resin refers to a resin 50 wt. % or more of whose resin components are the polyamide resin, and is meant to include the polyamide resin itself.

The glass-fiber-reinforced thermoplastic resin molded object is produced as described above, and has a specific glass fiber length distribution and the like as described below.

That is, the glass-fiber-reinforced thermoplastic resin molded object includes dispersed therein fibrous fillers, in which glass fibers subjected to a surface treatment with at least one of a urethane-based sizing agent and an acrylic urethane-based sizing agent, the glass fibers each having a fiber length described in any one of the following (A) to (D), are dispersed at ratios described in the following (A) to (D) with respect to a total number of the fibrous fillers, and a property described in the following (β) is satisfied together with a physical property described in the following (α). When the distribution of the glass fibers is adjusted as described above, a residual stress due to a difference in fiber length reduces. When many glass fibers each having a fiber length of 1.2 mm or more (D) remain, an appearance failure of the molded object occurs. In addition, the toughness of the molded object is lost and stress concentration occurs, and depending on the shape of the molded object, its breaking strength reduces in some cases. Accordingly, in the present disclosure, the ratio of the glass fibers each having a fiber length of 1.2 mm or more (D) is set to 0% or more and less than 1%. In addition, when the ratio of glass fibers each having a fiber length of 0.05 mm or more and less than 0.3 mm (A) is excessively large, superiority exhibited by the reinforcement with the fibers disappears. In order to suppress the residual stress, it is optimum that the molded object contains glass fibers each having a fiber length of 0.3 mm or more and less than 0.6 mm (B), and glass fibers each having a fiber length of 0.6 mm or more and less than 1.2 mm (C) at ratios within the following ranges. With such construction, an effect exhibited by the reinforcement with the fibers is large even in a high-temperature atmosphere or at the time of the water absorption of the molded object, and hence the strength of the molded object is improved. In consideration of the foregoing, the glass-fiber-reinforced resin molded object can achieve both improvements in mechanical strength and appearance by satisfying the following requirements:

(A) 0.05 mm or more and less than 0.3 mm: from 30% to 60%;
(B) 0.3 mm or more and less than 0.6 mm: from 30% to 60%;
(C) 0.6 mm or more and less than 1.2 mm: from 3% to 20%;
(D) 1.2 mm or more: 0% or more and less than 1%;
(α) an ISO multipurpose dumbbell of the glass-fiber-reinforced thermoplastic resin molded object has a tensile strength (MPa) under an atmosphere at 25° C. of more than a value Y (MPa) represented by the following equation (1):

$$Y=-0.05X^2+6X+70 \qquad (1)$$

where X represents a content (wt. %) of all the glass fibers in the glass-fiber-reinforced thermoplastic resin molded object; and
(β) unopened glass fibers are absent on a surface of the glass-fiber-reinforced thermoplastic resin molded object.

The measurement of the tensile strength described in (α) is performed on an ISO multipurpose dumbbell (test piece A type of ISO3167, thickness: 4 mm) serving as a sample of the glass-fiber-reinforced thermoplastic resin molded object with a tensile testing apparatus (manufactured by Shimadzu Corporation, AG-IS 100 kN) at a chuck-to-chuck distance of 115 mm and a tensile speed of 5 mm/min. In addition, as described in (α), the tensile strength (MPa) of the ISO multipurpose dumbbell under the atmosphere at 25° C. needs to be more than the value Y (MPa) represented by the equation (1). As represented by the equation (1), Y depends on the content of the glass fibers in the glass-fiber-reinforced thermoplastic resin molded object. That is, the following dependence of the resin molded object on the blending amount of glass fibers is observed: when the loading amount of the glass fibers is small, a substantially direct proportional relationship is established between the loading amount and the tensile strength of the resin molded object, but when the loading amount exceeds a certain amount, the tensile strength reduces. In addition, a relationship between the loading amount of glass fibers and the tensile strength of a resin molded object under the atmosphere at 25° C. was measured for each of conventional glass-fiber-reinforced thermoplastic resin molded objects. As a result, most of the molded objects showed tensile strengths lower than a quadratic curve represented by the equation (1). Accordingly, for the purpose of differentiating the present disclosure from such conventional products, in the present disclosure, it is specified that the tensile strength (MPa) of the ISO multipurpose dumbbell serving as the sample of the glass-fiber-reinforced thermoplastic resin molded object under the atmosphere at 25° C. need to be more than the value Y (MPa) represented by the equation (1). As a result, the product of the present disclosure is superior to the conventional products in tensile strength.

In particular, a value when the tensile strength (MPa) of the ISO multipurpose dumbbell under the atmosphere at 25° C. is measured in the same manner as that described above after its thickness has been set to 2 mm is preferably more than the value Y (MPa) represented by the equation (1) because the glass-fiber-reinforced thermoplastic resin molded object becomes more excellent in tensile strength. In addition, a standard deviation when the tensile test is performed with such ISO multipurpose dumbbell having a thickness of 2 mm as described above 5 times is desirably 8 or less.

The tensile strength (MPa) of the ISO multipurpose dumbbell (thickness: 4 mm) in a high-temperature atmosphere (100° C.) is desirably more than 0.6 times of the value Y (MPa) represented by the equation (1).

Further, as described in ((β), the glass-fiber-reinforced thermoplastic resin molded object is required to satisfy the following: unopened glass fibers are absent on its surface. As described above, the unopened glass fibers are absent, and hence the molded object is excellent in aesthetic appearance and is more optimum for applications where aesthetic appearance is required, such as an engine cover, a brake pedal wheel, and a wheel cover. Whether the unopened glass fibers are present or absent on the surface of the molded object is judged by, for example, a visual evaluation by a panelist.

In the glass-fiber-reinforced thermoplastic resin molded object, it is particularly preferred that the ratio of the glass fibers each having a fiber length described in (A) be from 35% to 55%, the ratio of the glass fibers each having a fiber length described in (B) be from 35% to 55%, the ratio of the glass fibers each having a fiber length described in (C) be from 5% to 20%, and the ratio of the glass fibers each having a fiber length described in (D) be 0% because the molded object becomes more excellent in terms of the achievement of both improvements in mechanical strength and appearance.

The ratios of the glass fibers described in (A) to (D) are ratios with respect to the total number of the fibrous fillers as described above, and can be measured in accordance with, for example, a method of measuring a glass fiber length distribution disclosed in JP-A-2002-5924. That is, the molded object is ashed at a temperature of from 500° C. to 700° C., and is uniformly dispersed in water whose weight is 1,000 or more times as large as the weight of its glass fibers after the ashing. Part of the uniformly dispersed liquid is removed from the uniformly dispersed liquid so that the weight of the glass fibers may fall within the range of from 0.1 mg to 2 mg, and the glass fibers are removed from the part of the uniformly dispersed liquid by filtration or drying. Fiber lengths are measured for the total number of the glass fibers, and the ratios (%) of the glass fibers corresponding to (A) to (D) are determined with respect to the total number. The measurement may be performed on the basis of fibers randomly selected from a fiber mass remaining after the ashing without dispersing the fiber mass in water as described above. In addition, in the method of measuring a glass fiber length distribution disclosed in the publication, the thermoplastic resin serving as the polymer of the molded object is melted and ashed at high temperature, and the glass fibers in the molded object are removed. However, the following method may be adopted: the thermoplastic resin is dissolved in a solvent, and the glass fibers in the molded object are removed. As is apparent from the method of measuring a glass fiber length distribution disclosed in the publication, the glass fiber length distribution described in (A) to (D) does not represent a state of distribution in a material (resin composition) of the molded object but represents a state of distribution in the molded object (resin cured object). In addition, the measurement of the fiber lengths and the number of the fibers is performed on the basis of, for example, an image photographed with a microscope.

Meanwhile, the content of all the glass fibers in the glass-fiber-reinforced thermoplastic resin molded object preferably falls within the range of from 25 wt. % to 65 wt. %, and more preferably falls within the range of from 40 wt. % to 60 wt. %. That is, this is because such setting provides a desired reinforcing effect. The content can be measured at the stage of a molded object material because the content has no relation to the fiber lengths.

As described in the foregoing, the glass fibers dispersed in the glass-fiber-reinforced thermoplastic resin molded object are glass fibers subjected to a surface treatment with at least one of the urethane-based sizing agent and the acrylic urethane-based sizing agent, and hence the dispersibility of the glass fibers can be improved and the occurrence of unopened glass fibers in the glass-fiber-reinforced thermoplastic resin molded object can be effectively suppressed. In addition, the molded object is excellent in mechanical strength and aesthetic appearance in an actual use environment. In particular, when the glass fibers are glass fibers subjected to a surface treatment with the acrylic urethane-based sizing agent, the strength of the molded object under actual use conditions becomes more excellent. The fiber diameter of each of the glass fibers is preferably from 3 μm to 25 μm, more preferably from 8 μm to 20 μm.

The weight-average fiber length of the glass fibers dispersed in the glass-fiber-reinforced thermoplastic resin molded object is measured, for example, as described below. That is, about 1 g of a sample of the molded object is collected, and the sample is thermally treated at a temperature of from 500° C. to 700° C. to be ashed. Fibers are randomly selected from a fiber mass remaining after the ashing, and are photographed with a microscope. The weight-average fiber length is measured on the basis of the resultant image in accordance with the following equation (2). Blur fibers (less than 0.05 mm) are excluded from the measurement.

$$\text{Weight-average fiber length } (Lw) = (\Sigma qi \times Li^2)/(\Sigma qi \times Li) \quad (2)$$

[In the equation (2), Li represents a fiber length and qi represents the number of fibers each having the fiber length Li.]

In addition, the weight-average fiber length of the glass fibers dispersed in the glass-fiber-reinforced thermoplastic resin molded object preferably falls within the range of from 0.3 mm to 0.7 mm, and more preferably falls within the range of from 0.4 mm to 0.6 mm from the viewpoints of a mechanical strength and aesthetic appearance.

In addition, examples of the thermoplastic resin to be used in the glass-fiber-reinforced thermoplastic resin molded object include a polyamide resin, a polyethylene resin, a polypropylene resin, a polystyrene resin, a polycarbonate resin, an acrylonitrile-butadiene-styrene copolymer resin, a polyethylene terephthalate resin, a polybutylene terephthalate resin, a polyacetal resin, a modified polyphenylene ether resin, and a polyphenylene sulfide resin. Those thermoplastic resins may be used alone or in combination thereof.

In addition, when the thermoplastic resin to be used in the glass-fiber-reinforced thermoplastic resin molded object is a polyamide-based resin, the glass-fiber-reinforced thermoplastic resin molded object becomes more excellent in, for example, strength and elasticity in a high-temperature atmosphere.

In addition to the glass fibers, fibrous fillers, such as aramid fibers (AF) and carbon fibers (CF), can be incorporated into the glass-fiber-reinforced thermoplastic resin molded object. However, their ratio is limited to less than 35% of the total number of the fibrous fillers, and their weight-average fiber length is limited to less than 0.7 mm. That is, this is because when fibrous fillers that do not have such properties are incorporated, actions and effects obtained by the glass fibers having the fiber length distribution described in (A) to (D) may be adversely affected.

In addition, in the material for the glass-fiber-reinforced thermoplastic resin molded object, for example, a colorant (dye or pigment), a heat stabilizer, an antioxidant, an inorganic filler, a crystal nucleating agent, a weathering agent, a plasticizer, a lubricant, or an impact-resistant material may be appropriately added as required.

The glass-fiber-reinforced thermoplastic resin molded object can exhibit excellent performance in applications where a mechanical strength is required like bearing parts for automobiles, such as an engine mount, a bush, and a torque rod. In addition to the foregoing, unopened glass fibers are absent on the surface of the glass-fiber-reinforced thermoplastic resin molded object, and hence the molded object is excellent in aesthetic appearance and can also exhibit excellent performance in applications where aesthetic appearance is required, such as an engine cover, a brake pedal wheel, and a wheel cover.

EXAMPLES

Next, Examples are described together with Comparative Examples. However, the present disclosure is not limited to these Examples without departing from the gist of the present disclosure.

First, materials listed below were prepared prior to Examples and Comparative Examples.

[PA66]

Polyamide 66 (PA66) pellet (manufactured by Asahi Kasei Chemicals Corporation, Leona 1402S)

[GF (i)]

Glass fiber chopped strands obtained by cutting a roving formed of glass filaments each having a fiber diameter φ of 13 μm, the glass filaments being subjected to a surface treatment (adhesion of 0.4 wt. % in terms of a solid content) with an acrylic urethane-based sizing agent [sizing agent containing 50 wt. % or more of a polyurethane-based resin and an acrylic resin, and containing γ-aminopropyltrimethoxysilane and an ether-based surfactant], into a length of 1.2 mm

[GF (ii)]

Glass fiber chopped strands obtained by cutting a roving formed of glass filaments each having a fiber diameter φ of 13 μm, the glass filaments being subjected to a surface treatment with the acrylic urethane-based sizing agent, into a length of 1.5 mm

[GF (iii)]

Glass fiber chopped strands obtained by cutting a roving formed of glass filaments each having a fiber diameter φ of 13 μm, the glass filaments being subjected to a surface treatment with a urethane-based sizing agent [sizing agent containing 50 wt. % or more of a polyurethane-based resin, and containing γ-aminopropyltrimethoxysilane and an ether-based surfactant], into a length of 1.5 mm

[GF (iv)]

Glass fiber chopped strands obtained by cutting a roving formed of glass filaments each having a fiber diameter φ of 13 μm, the glass filaments being subjected to a surface treatment with the acrylic urethane-based sizing agent, into a length of 1.8 mm

[GF (v)]

Glass fiber chopped strands obtained by cutting a roving formed of glass filaments each having a fiber diameter φ of 13 μm, the glass filaments being subjected to a surface treatment with the acrylic urethane-based sizing agent, into a length of 1.0 mm

[GF (vi)]

Glass fiber chopped strands obtained by cutting a roving formed of glass filaments each having a fiber diameter φ of 13 μm, the glass filaments being subjected to a surface treatment with the acrylic urethane-based sizing agent, into a length of 2.0 mm

[GF (vii)]

Glass fiber chopped strands obtained by cutting a roving formed of glass filaments each having a fiber diameter φ of 13 μm, the glass filaments being subjected to a surface treatment with the acrylic urethane-based sizing agent, into a length of 6.0 mm

[GF (viii)]

Glass fiber chopped strands obtained by cutting a roving formed of glass filaments each having a fiber diameter φ of 13 μm, the glass filaments being subjected to a surface treatment with an epoxy-based sizing agent, into a length of 1.5 mm

[Short Fiber-reinforced PA]

Short fiber-reinforced PA66GF50 (manufactured by Asahi Kasei Chemicals Corporation, Leona 14G50 X01)

Examples 1 to 5 and Comparative Examples 1 to 5

The above-mentioned respective materials were each directly loaded at a ratio shown in Table 2 to be described later into an injection molding machine (manufactured by Sumitomo Heavy Industries, Ltd., SE-130EV (φ36 mm)), and were subjected to injection molding under injection conditions shown in Table 1 below to provide respective test pieces (an ISO multipurpose dumbbell (thickness: 4 mm), a thin-walled dumbbell (dumbbell having the same shape as that of the ISO multipurpose dumbbell and having a thickness of 2 mm), and a plate material measuring 170 mm long by 50 mm wide by 12 mm thick).

TABLE 1

| Injection condition of injection molding machine | ISO multipurpose dumbbell (t = 4 mm) | Thin-walled dumbbell (t = 2 mm) | Plate material measuring 170 mm long by 50 mm wide by 12 mm thick |
|---|---|---|---|
| Cylinder preset temperature | 300° C. ± 10° C. | 280° C. ± 10° C. | 280° C. ± 10° C. |
| Die temperature | 80° C. | 80° C. | 80° C. |
| Injection speed | 40 ± 5 cm²/sec | 40 ± 5 cm²/sec | 40 ± 5 cm²/sec |
| Dwell pressure | 80 MPa | 80 MPa | 80 MPa |
| Screw back pressure | 5 MPa | 5 MPa | 5 MPa |

For the test piece of each of Examples and Comparative Examples obtained as described above, various properties were evaluated in accordance with criteria described below. The results of the evaluation are also shown in Table 2 below.

<Fiber Length Distribution of Molded Object>

About 1 g was collected from a test piece (dumbbell having the same shape as that of the ISO multipurpose dumbbell and having a thickness of 2 mm), and was thermally treated with an electric furnace (manufactured by Yamato Scientific Co., Ltd., Muffle Furnace FO810) at 600° C. for 3 hours to be ashed. Then, fibers were randomly selected from a fiber mass remaining after the ashing, and were photographed with a microscope (manufactured by Keyence Corporation, VHX-1000) at a magnification of from 50 to 100 (the number of photographed images was from 3 to 5, and the total number of observed fibers was from 300 to 500). Fiber lengths were measured for the total number of the glass fibers, and the ratios (%) of the glass fibers corresponding to the following (A) to (D) were determined with respect to the total number. Blur fibers (less than 0.05 mm) were excluded from the measurement.

(A) 0.05 mm or more and less than 0.3 mm
(B) 0.3 mm or more and less than 0.6 mm
(C) 0.6 mm or more and less than 1.2 mm
(D) 1.2 mm or more <Weight-average Fiber Length>

About 1 g was collected as a sample from a test piece (dumbbell having the same shape as that of the ISO multipurpose dumbbell and having a thickness of 2 mm), and the sample was thermally treated with an electric furnace (manufactured by Yamato Scientific Co., Ltd., Muffle Furnace FO810) at 600° C. for 3 hours to be ashed. Then, fibers were randomly selected from a fiber mass remaining after the ashing, and were photographed with a microscope (manufactured by Keyence Corporation, VHX-1000) at a magnification of from 50 to 100 (the number of photographed images was from 3 to 5, and the total number of observed fibers was from 300 to 500). The weight-average fiber length of the glass fibers in the test piece was measured on the basis of the images in accordance with the following equation (2). Blur fibers (less than 0.05 mm) were excluded from the measurement.

$$\text{Weight-average fiber length } (Lw) = (\Sigma q_i \times L_i^2)/(\Sigma q_i \times L_i) \quad (2)$$

[In the equation (2), Li represents a fiber length and qi represents the number of fibers each having the fiber length Li.]

<Y Value>

A value Y (MPa) represented by the following equation (1) was determined.

$$Y = -0.05X^2 + 6X + 70 \quad (1)$$

[X represents the content (wt. %) of all the glass fibers in the glass-fiber-reinforced thermoplastic resin molded object.]

<Tensile Test (I)>

The tensile strength (MPa) of a test piece (ISO multipurpose dumbbell having a thickness of 4 mm) was measured with a tensile testing apparatus (manufactured by Shimadzu Corporation, AG-IS 100 kN) at a chuck-to-chuck distance of 115 mm and a tensile speed of 5 mm/min. In this example, the tensile strength of the test piece in a room temperature of 25° C. (RT) is required to be more than the foregoing Y value (MPa). In addition, in this example, the tensile strength of the test piece in a high-temperature atmosphere (100° C.) is desirably more than 0.6 times of the foregoing Y value (MPa).

<Tensile Test (II)>

The tensile strength (MPa) of the thin-walled dumbbell (dumbbell having the same shape as that of the ISO multipurpose dumbbell and having a thickness of 2 mm) was measured with a tensile testing apparatus (manufactured by Shimadzu Corporation, AG-IS 100 kN) at a chuck-to-chuck distance of 115 mm and a tensile speed of 5 mm/min in a room temperature of 25° C. (RT). In this example, the tensile strength of the thin-walled dumbbell is desirably more than the foregoing Y value (MPa). In addition, the term "strength variation" shown in Table 2 represents a standard deviation when the tensile test is performed 5 times, and the standard deviation is desirably 8 or less.

<Appearance>

The presence or absence of unopened glass fibers observed on the surface of a test piece (plate material) was visually observed by 3 panelists, and when each of the panelists judged that the unopened glass fibers were observed, the number of the unopened glass fibers was measured. Then, a test piece in which the 3 panelists judged that the unopened glass fibers were completely absent was evaluated as "○", a test piece in which the number of the unopened glass fibers was judged to be 1 or more and less than 10 on average by the 3 panelists was evaluated as "Δ", and a test piece in which the number of the unopened glass fibers was judged to be 10 or more on average by the 3 panelists was evaluated as "×".

<Handleability (I) at Time of Molding (Static Electricity Resistance)>

The respective materials were each directly loaded into the injection molding machine. After that, a case in which glass fiber chopped strands adhered to the hopper of the injection molding machine, and hence continuous molding could not be performed was evaluated as "×", and a case in which the adhesion of glass fiber chopped strands that could interfere with the continuous molding was absent was evaluated as "○".

<Handleability (II) at Time of Molding (Ease with which Cotton Occurs)>

The respective materials were each directly loaded into the injection molding machine. After that, a case in which glass fiber cotton occurred in the hopper of the injection molding machine, and hence the continuous molding could not be performed was evaluated as "×", and a case in which the occurrence of glass fiber cotton was substantially or completely absent, and hence no interference with the continuous molding occurred was evaluated as "○".

As can be seen from the above-mentioned results, in each of Examples, the handleability at the time of the production of a test piece (handleability at the time of the molding) is excellent. In addition, the test pieces of Examples thus obtained are excellent in tensile strength even when the test pieces have thin-walled shapes. Moreover, the test pieces are excellent in appearance, and achieve both improvements in mechanical strength and appearance.

In contrast, in Comparative Examples 1 to 3, glass fiber chopped strands having fiber lengths specified in the present disclosure were not used, and hence the following results were obtained: the handleability at the time of the molding was poor, and the resultant test pieces were inferior to the test pieces of Examples in appearance and in tensile strength of a thin-walled molded product. In Comparative Example 4, the glass fiber chopped strands subjected to the surface treatment with the epoxy-based sizing agent were used, and hence the following results were obtained: the resultant test pieces were inferior to the test pieces of Examples in appearance and tensile strength. The test pieces of Comparative Example 5 were inferior to the test pieces of Examples in tensile strength because the fiber length distribution of the glass fibers of each of the test pieces did not satisfy the specification of the present disclosure.

The glass-fiber-reinforced thermoplastic resin molded object can exhibit excellent performance in applications where a mechanical strength is required like bearing parts for automobiles, such as an engine mount, a bush, and a torque rod. In addition to the foregoing, the molded object can also exhibit excellent performance in applications where aesthetic appearance is required, such as an engine cover, a brake pedal wheel, and a wheel cover. In addition, the method of producing a glass-fiber-reinforced thermoplastic

TABLE 2

| | | Example | | | | | Comparative Example | | | | (wt. %) |
|---|---|---|---|---|---|---|---|---|---|---|---|
| | | 1 | 2 | 3 | 4 | 5 | 1 | 2 | 3 | 4 | 5 |
| PA66 | | 50 | 50 | 50 | 40 | 50 | 50 | 50 | 50 | 50 | — |
| GF (i) | | 50 | — | — | — | — | — | — | — | — | — |
| GF (ii) | | — | 50 | — | 60 | — | — | — | — | — | — |
| GF (iii) | | — | — | 50 | — | — | — | — | — | — | — |
| GF (iv) | | — | — | — | — | 50 | — | — | — | — | — |
| GF (v) | | — | — | — | — | — | 50 | — | — | — | — |
| GF (vi) | | — | — | — | — | — | — | 50 | — | — | — |
| GF (vii) | | — | — | — | — | — | — | — | 50 | — | — |
| GF (viii) | | — | — | — | — | — | — | — | — | 50 | — |
| Short fiber-reinforced PA | | — | — | — | — | — | — | — | — | — | 100 |
| Fiber length distribution of molded object (%) | A | 41 | 39 | 39 | 40 | 39 | 46 | 39 | 38 | 39 | 80 |
| | B | 45 | 45 | 45 | 45 | 45 | 45 | 45 | 44 | 45 | 20 |
| | C | 14 | 16 | 16 | 15 | 16 | 9 | 16 | 17 | 16 | 0 |
| | D | 0 | 0 | 0 | 0 | 0 | 0 | 0 | 1 | 0 | 0 |
| Weight-average fiber length (mm) | | 0.50 | 0.55 | 0.55 | 0.55 | 0.55 | 0.45 | 0.55 | 0.60 | 0.55 | 0.28 |
| Y value (MPa) | | 245 | 245 | 245 | 250 | 245 | 245 | 245 | 245 | 245 | — |
| Tensile test (I) (MPa) | RT | 255 | 261 | 265 | 267 | 261 | 243 | 262 | 262 | 241 | 214 |
| | 100° C. | 155 | 159 | 160 | 163 | 160 | 147 | 160 | 161 | 140 | 125 |
| Tensile test (II) | Tensile strength (MPa) | 250 | 255 | 256 | 261 | 254 | 239 | 244 | 242 | 236 | 210 |
| | Strength variation (standard deviation) | 4.7 | 5.0 | 3.9 | 6.2 | 6.2 | 4.3 | 9.4 | 10.5 | 8.6 | 3.4 |
| Appearance | | ○ | ○ | ○ | ○ | ○ | ○ | Δ | × | Δ | ○ |
| Handleability at time of molding | (I) | ○ | ○ | ○ | ○ | ○ | × | ○ | ○ | ○ | ○ |
| | (II) | ○ | ○ | ○ | ○ | ○ | ○ | × | × | ○ | ○ |

The invention claimed is:

1. A method of producing a glass-fiber-reinforced polyamide-based resin molded object, comprising:
   directly loading a polyamide-based resin and glass fiber chopped strands subjected to a surface treatment with at least one of a urethane-based sizing agent and an acrylic urethane-based sizing agent, the glass fiber chopped strands each having a fiber length of from 1.2 mm to 1.8 mm into an injection molding machine, and
   injection molding thereof to provide a glass-fiber-reinforced polyamide-based resin molded object,
   wherein the polyamide-based resin molded object has dispersed therein fibrous fillers including glass fibers,
   wherein the content of all glass fibers in the glass-fiber-reinforced polyamide-based resin molded object is from 25 wt. % to 65 wt. %,
   wherein the glass fibers in the glass-fiber-reinforced polyamide-based resin molded object have a fiber length described in the following (A) to (D), and are dispersed at ratios with respect to a total number of the fibrous fillers described in the following (A) to (D), and
   wherein, in the glass-fiber-reinforced polyamide-based resin molded object, a property described in the following ($\beta$) is satisfied together with a physical property described in the following ($\alpha$):
(A) 0.05 mm or more and less than 0.3 mm: from 30% to 60%;
(B) 0.3 mm or more and less than 0.6 mm: from 30% to 60%;
(C) 0.6 mm or more and less than 1.2 mm: from 3% to 20%;
(D) 1.2 mm or more: 0% or more and less than 1%;
   ($\alpha$) the glass-fiber-reinforced polyamide-based resin molded object has, when formed as an ISO multipurpose dumbbell by injection molding, a tensile strength (MPa) under an atmosphere at 25° C. of more than a value Y (MPa) represented by the following equation (1):

$$Y=-0.05X^2+6X+70 \quad (1)$$

where X represents a content (wt. %) of all the glass fibers in the glass-fiber-reinforced polyamide-based resin molded object; and
   ($\beta$) unopened glass fibers are absent on a surface of a plate material, the plate material being obtained by forming the glass-fiber-reinforced polyamide-based resin molded object by injection molding as the plate material measuring 170 mm long by 50 mm wide by 12 mm thick.

2. The method of producing a glass-fiber-reinforced polyamide-based resin molded object according to claim 1, wherein the glass fiber chopped strands each having a fiber length of from 1.2 mm to 1.8 mm comprise glass fiber chopped strands subjected to a surface treatment with the acrylic urethane-based sizing agent.

3. A glass-fiber-reinforced polyamide-based resin molded object, comprising:
   a polyamide-based resin molded object having dispersed therein fibrous fillers including glass fibers subjected to a surface treatment with at least one of a urethane-based sizing agent and an acrylic urethane-based sizing agent,
   wherein the content of all glass fibers in the glass-fiber-reinforced polyamide-based resin molded object is from 25 wt. % to 65 wt. %,
   wherein the glass fibers have a fiber length described in the following (A) to (D), and are dispersed at ratios with respect to a total number of the fibrous fillers described in the following (A) to (D), and wherein a property described in the following ($\beta$) is satisfied together with a physical property described in the following ($\alpha$):
(A) 0.05 mm or more and less than 0.3 mm: from 30% to 60%;
(B) 0.3 mm or more and less than 0.6 mm: from 30% to 60%;
(C) 0.6 mm or more and less than 1.2 mm: from 3% to 20%;
(D) 1.2 mm or more: 0% or more and less than 1%;
   ($\alpha$) the glass-fiber-reinforced polyamide-based resin molded object has, when formed as an ISO multipurpose dumbbell by injection molding, a tensile strength (MPa) under an atmosphere at 25° C. of more than a value Y (MPa) represented by the following equation (1):

$$Y=-0.05X^2+6X+70 \quad (1)$$

where X represents a content (wt. %) of all the glass fibers in the glass-fiber-reinforced polyamide-based resin molded object; and
   ($\beta$) unopened glass fibers are absent on a surface of a plate material, the plate material being obtained by forming the glass-fiber-reinforced polyamide-based resin molded object by injection molding as the plate material measuring 170 mm long by 50 mm wide by 12 mm thick.

4. The glass-fiber-reinforced polyamide-based resin molded object according to claim 3, wherein the glass fibers comprise glass fibers subjected to a surface treatment with the acrylic urethane-based sizing agent.

* * * * *